June 16, 1959 R. NOACK 2,890,640
PHOTOGRAPHIC SHUTTER
Filed Jan. 18, 1956

INVENTOR.
ROLF NOACK
BY

2,890,640
PHOTOGRAPHIC SHUTTER

Rolf Noack, Dresden, Germany, assignor to VEB Zeiss Ikon Dresden, Dresden, Germany Application January 18, 1956, Serial No. 560,035

7 Claims. (Cl. 95—63)

This invention relates to shutters for photographic cameras, and more particularly to shutters provided with reciprocable leaves pivoted to two leaf-actuating rings, said rings being rotatable in one direction for the tensioning and in the opposite direction for the exposure.

An object of the invention is to provide a shutter simple in design and adapted for cameras which require a comparatively very short tensioning stroke without an excessively high tensioning force and which, nevertheless, are capable of taking pictures in a comparatively very short exposure time.

Another object of the invention is to provide a shutter of the class above referred to which is particularly adapted for cameras where the advancement of the film and the tensioning of the shutter is synchronized in an interacting operation.

A further object of the invention is to so simplify and improve on the construction of shutters having two leaf-actuating rings that the rings are released one after another and that the interval between the release of the two rings is regulated in a predetermined manner by a controlling element being subjected to the action of a separate drive and being retarded by a retarding device.

Another object of the invention is to provide a shutter wherein the leaf-actuating rings are rotated only through such an angle of rotation which is absolutely necessary for the opening and closing of the shutter.

Figure 1:
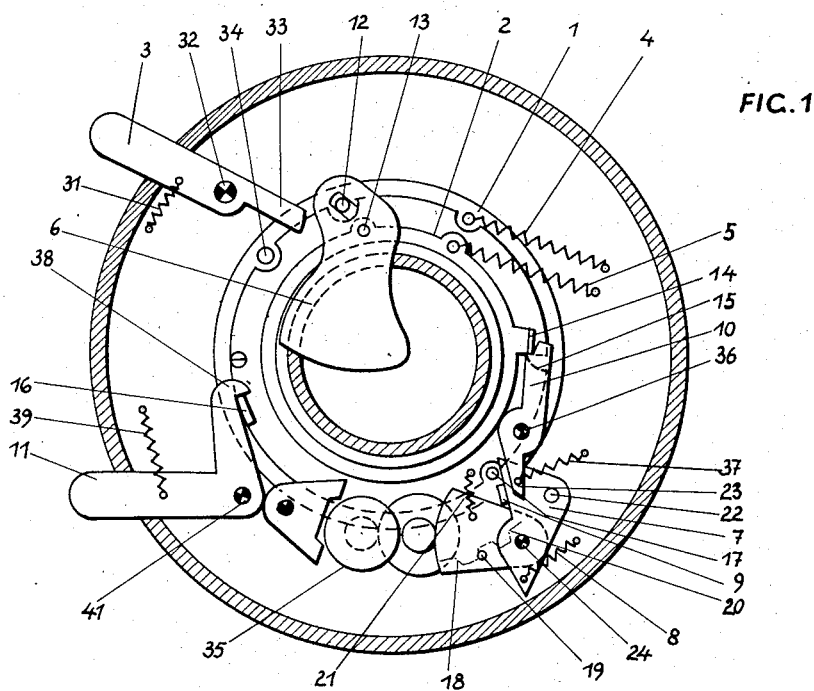
Figure 2:
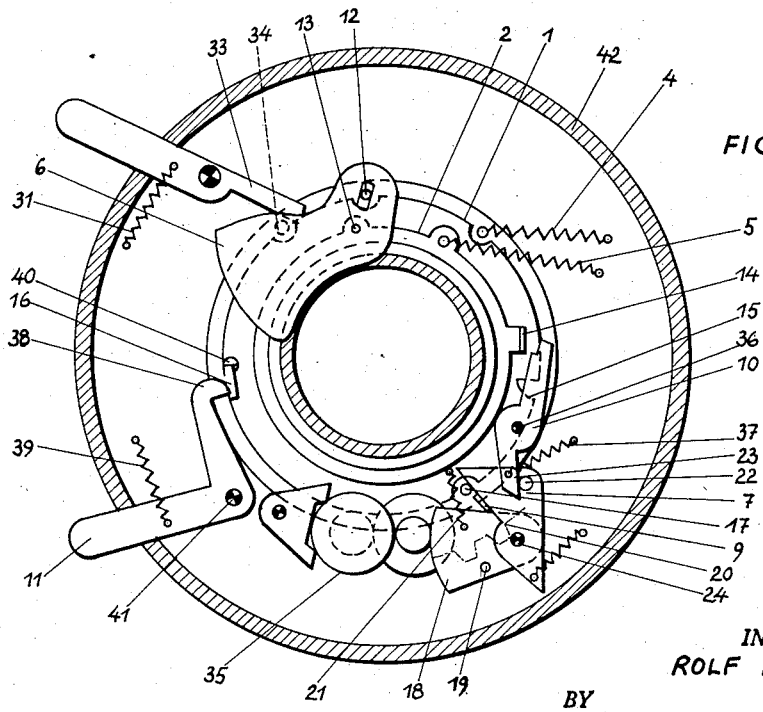

Other objects and structural details of the invention will be apparent from the following description when read in conjunction with the accompanying drawings forming part of this specification, wherein:

Fig. 1 is a somewhat diagrammatical sectional view of a shutter wherein the parts are in tensioned position, and Fig. 2 is a somewhat diagrammatical sectional view of the same shutter wherein, however, the parts are shown in the position when the second leaf-actuating ring is just released by the control mechanism.

Referring now to Figs. 1 and 2, leaf-actuating rings 1 and 2 are rotatably mounted in a casing 42. Each of said rings 1 and 2 is drivingly connected with a plurality of leaves or blades 6 by pivots 12 and 13. For the sake of clarity, only one leaf 6 and one set of pivots 12 and 13 associated therewith are shown in the drawings.

The arm 33 of a tensioning lever 3 swingably mounted at 32 and biased by a spring 31 may be brought into engagement with a pin 34 mounted on the first leaf-actuating ring 1. When the tensioning lever 3 is swung in clockwise direction, the arm 33 thereof cooperating with the pin 34 of the ring 1 causes a rotation of the latter in counter-clockwise direction into the tensioned position shown in Fig. 1. A nose 15 or the like arranged on the inner surface of the ring 1 comes into engagement with a bent lug 14 arranged on the second leaf-actuating ring 2 when the first leaf-actuating ring 1 is tensioned by the tensioning lever 3, whereby the second leaf-actuating ring 2 is likewise tensioned. The movement of the rings 1 and 2 into their tensioned position takes place against the action of the springs 4 and 5, respectively.

During above described rotation of the leaf-actuating ring 1 from the released position into the tensioned position a pin 17 mounted on said ring 1 comes into engagement with a controlling member 7 swingably mounted at 24 for moving same into the tensioned position shown in Fig. 1 against the action of the spring 8.

The controlling member 7 has an abutment 9 arranged for cooperation with a toothed segment 18 of a retarding device generally indicated by 35. The segment 18 is swingable about the pivot 24 about which, as mentioned above, the controlling member 7 also rotates. When, as described above, the controlling member 7 is swung by the pin 17 from the position shown in Fig. 2 into the position shown in Fig. 1, the displaced abutment 9 permits the toothed segment 18 to follow and to swing about its pivot 24 by means of a spring 21 from the position shown in Fig. 2 into the position shown in Fig. 1. Thus the toothed segment 18 is brought automatically into its operative position by the tensioning of the rings 1 and 2 by means of the tensioning lever 3. When the toothed segment 18 is brought into said position shown in Fig. 1, a pin 19 mounted on said segment 18 comes into engagement with a control stop 20 of a settable member of an exposure time adjusting device.

When the rings 1 and 2 arrive at the end of their tensioning stroke, a locking pawl 10 swingably mounted on the casing at 36 and biased by a spring 37 comes into engagement with the lug 14 of the leaf-actuating ring 2 for holding same in its tensioned position. Furthermore, an abutment 16 attached to the leaf-actuating ring 1 comes into engagement with a hook 38 of a release lever 11 swingably mounted on the casing at 41 and biased by a spring 39, whereby said ring 1 is locked in its tensioned position. Moreover, a pin 17 mounted on the thus locked ring 1 comes into engagement with the controlling member 7 for holding same in the tensioned position shown in Fig. 1. When the rings 1 and 2 are in the tensioned position shown in Fig. 1, the leaves 6 are in a position closing the shutter.

Upon an actuation of the release lever 11 against the action of the spring 39, the hook 38 of said lever 11 is disengaged from the abutment 16, so that the leaf-actuating ring 1, being released, may be rotated in clockwise rotation by the spring 4. Said rotation of the ring 1 causes a rotation of the leaves 6 about their pivot 13 on the still blocked ring 2 into the opening position shown in Fig. 2. Furthermore said rotation of the ring 1 causes a release of the controlling member 7 by the pin 17, so that the spring 8 being stronger than the spring 21 may swing the controlling member 7 about its pivot 24. Said rotation of the controlling member 7, however, is retarded by the retarding device 35, the toothed segment 18 of which is in engagement with the abutment 9 of the controlling member 7. After a selectively adjustable period of time depending on the adjustable position of the control stop 20 a pin 22 arranged on the control member 7 comes into engagement with the arm 23 of the locking pawl 10 whereby the latter is disengaged from the lug 14 on the ring 2 for a release of the latter. Thus, the released ring 2 may be rotated in clockwise direction, whereby the leaves 6 ar rotated about their pivots 12 on the ring 1 now held in its posistion by the engagement of the abutment 16 with a stop 40 (see Fig. 2). Said second rotation of the leaves 6 returns same into closing position.

The shutter according to the invention provides for the feature of a short tensioning stroke of the leaf-actuating rings. Said feature is also of advantage when the shutter is used as a so-called automatic shutter. For this purpose it is unnecessary according to the invention to provide for a special transmission or other means causing a ratio of movements reducing the tensioning stroke of the leaf-actuating rings; it is, however, merely necessary to make the arrangement in such a manner that the tensioning lever 3 is disengaged from the ring 1 after a movement through an angle of rotation corresponding to the tensioning stroke.

I have described preferred embodiments of my invention, but it is understood that this disclosure is for the purpose of illustration and that various omissions or changes, in shape, proportion and arrangement of parts, as well as the substitution of equivalent elements for those herein shown and described, may be made without departing from the spirit and scope of the invention as set forth in the appended claims.

What I claim is:

1. A photographic shutter comprising a casing, a first rotatable leaf actuating ring, a second rotatable leaf actuating ring, resilient biasing means connecting each of said first and second rings to said casing, means to rotate said rings against the force of said resilient biasing means into a tensioned position, first holding means for holding said first ring in a tensioned position, second holding means for holding said second ring in a tensioned position, a plurality of leaves movably connected with each of said rings, manually operable releasing means connected to said first holding means and being disengageable therefrom to cause release of said first ring only, said second ring being maintained in a tensioned position for a predetermined period after release of said first ring, controlling means connecting said first ring and said second holding means including means movable after release of said first ring to disengage said second holding means from said second ring and time delay means to regulate the movement of said movable means.

2. A photographic shutter according to claim 1 wherein said second holding means includes cooperating abutment means on said first and second rings, said abutment means being engageable upon movement of said rings into a tensioned position.

3. A photographic shutter according to claim 1 wherein said means for rotating said ring includes a lever pivotally mounted on said casing having a finger operable portion projecting outwardly therefrom.

4. A photographic shutter according to claim 1 wherein said second holding means includes an abutment on said second ring, a pawl pivotally mounted on said casing and wherein said control movable means includes a member movable into the path of said pawl to disengage it from said abutment, said member being movable upon release of said first ring and in response to movement thereof.

5. A photographic shutter according to claim 4 including a pin on said first ring, said movable member having a portion thereof in the path of movement of said first pin upon release of said first holding means, said member being movable by said pin against said pawl to release it from said abutment.

6. A photographic shutter according to claim 5 wherein said time delay means includes means to retard movement of said member in response to the movement of said pins.

7. A photographic shutter comprising a casing, a first rotatable leaf actuating ring, a second rotatable leaf actuating ring, resilient biasing means connecting each of said first and second rings with said casing, a tensioning lever pivotally mounted on said casing and including an arm engageable with said rings to rotate said rings against the force of said resilient biasing means into a tensioned position, a shutter releasing lever pivotally mounted on said casing and biased into a direction toward engagement with said first ring, a first abutment on said first ring being movable past a portion of said shutter releasing lever and engageable therewith when said ring is in a tensioned position, a second abutment on said second ring, a pawl pivotally mounted on said casing and having a portion engageable with said second abutment when said second ring is in a tensioned position, a member pivotally mounted on said casing and having a portion thereof extending over said first ring, a pin on said first ring in contact with said member when said ring is in a tensioned position, means to bias said member in a direction toward contact with said pin, said member being movable in the direction of said pin upon release of said first ring from a tensioned position, a tripping pin on said member being movable with said member on release of said first ring to intersect the path of said pawl and effect its disengagement from said second abutment, and means to retard movement of said member upon release of said first ring whereby said second ring is not released until a predetermined time interval after release of said first ring.

References Cited in the file of this patent

UNITED STATES PATENTS

| | | |
|---|---|---|
| 2,326,077 | Steiner | Aug. 3, 1943 |
| 2,351,932 | Deckel et al. | June 20, 1944 |
| 2,578,604 | Santoni | Dec. 11, 1951 |
| 2,815,702 | Weise et al. | Dec. 10, 1957 |